Figure 1:
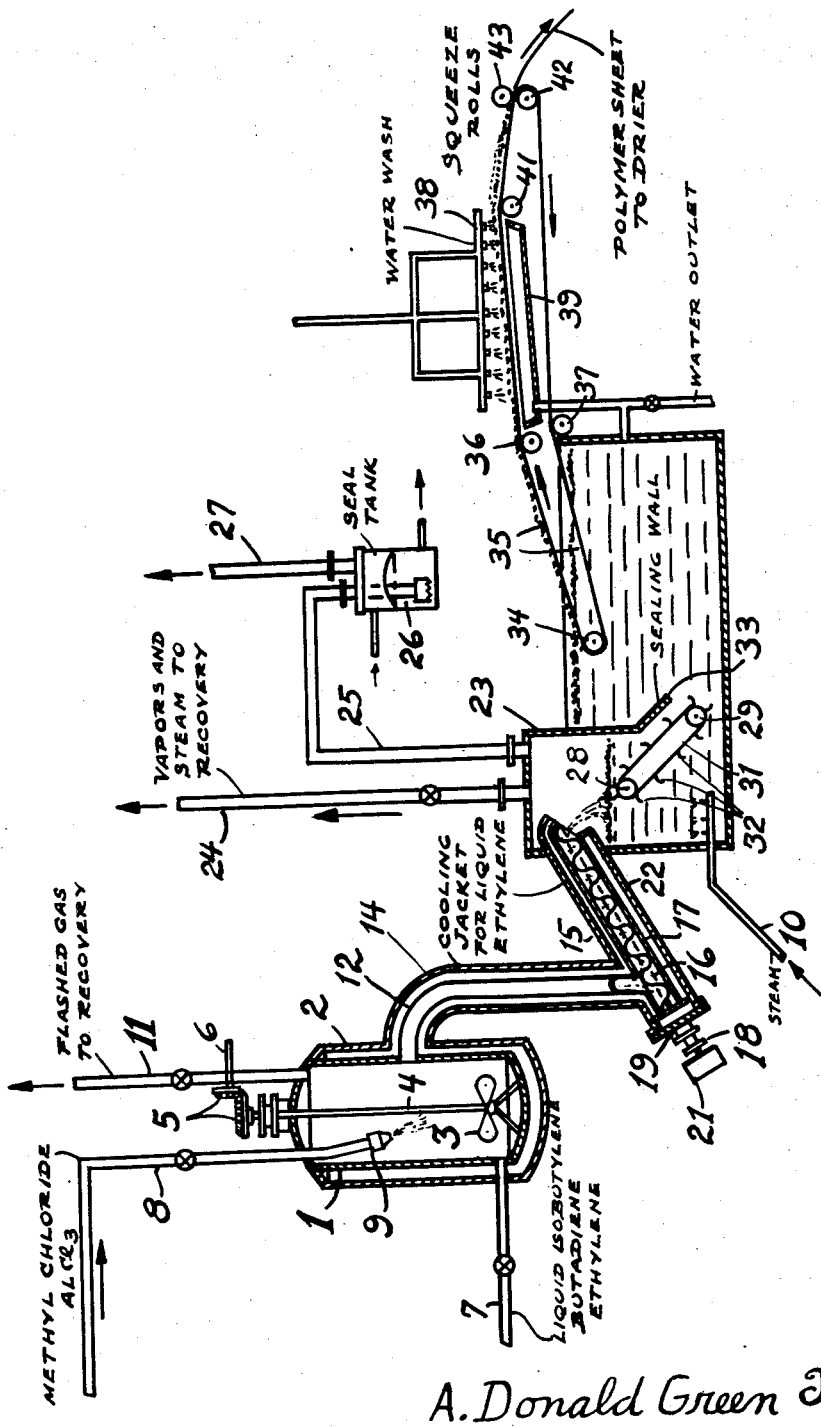

March 8, 1949.  A. D. GREEN  2,463,866
PROCESS FOR THE PRODUCTION AND RECOVERY
OF OLEFINIC ELASTOMERS
Filed Nov. 25, 1943  5 Sheets-Sheet 1

A. Donald Green Inventor
By P. L. Young Attorney

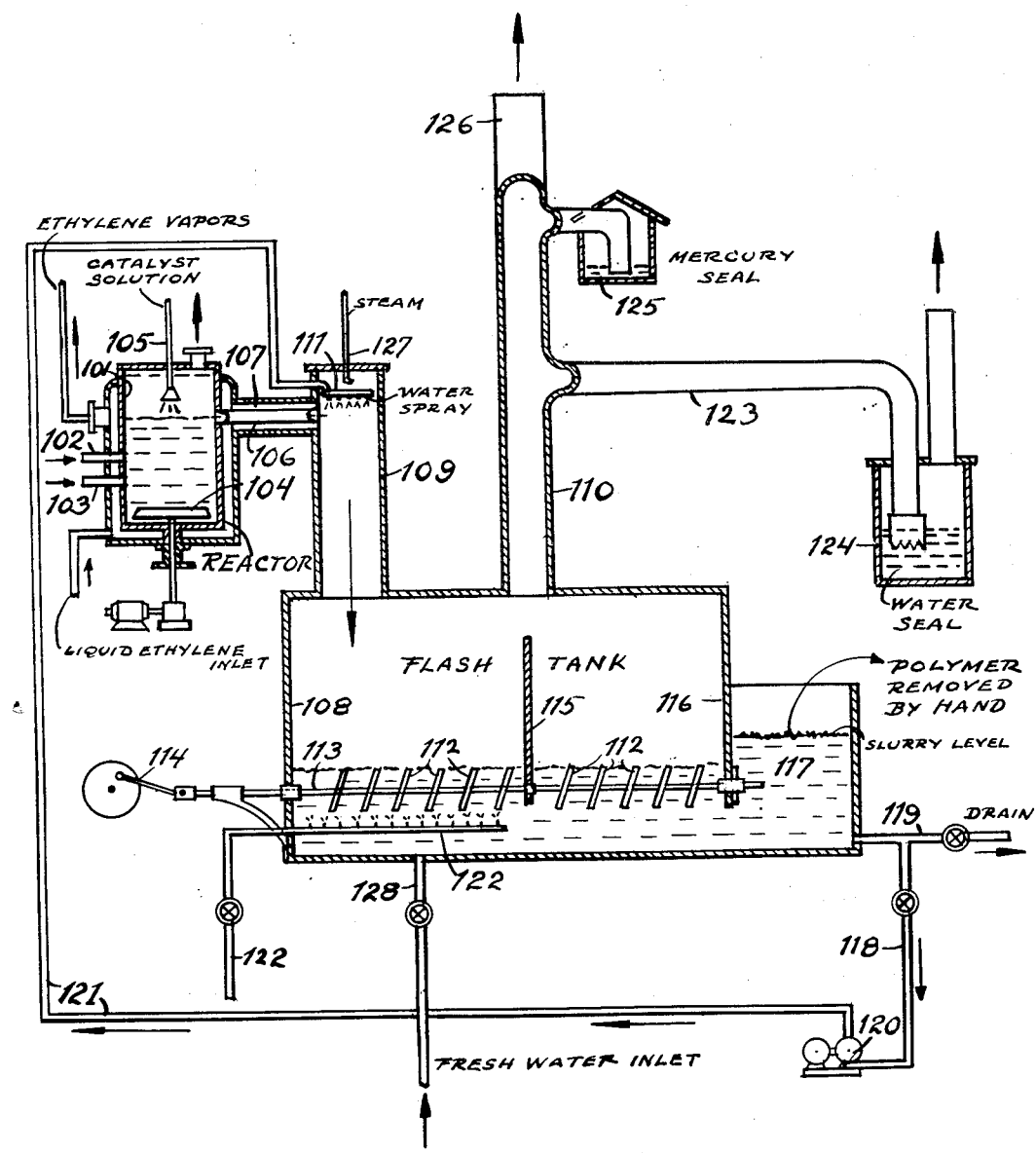

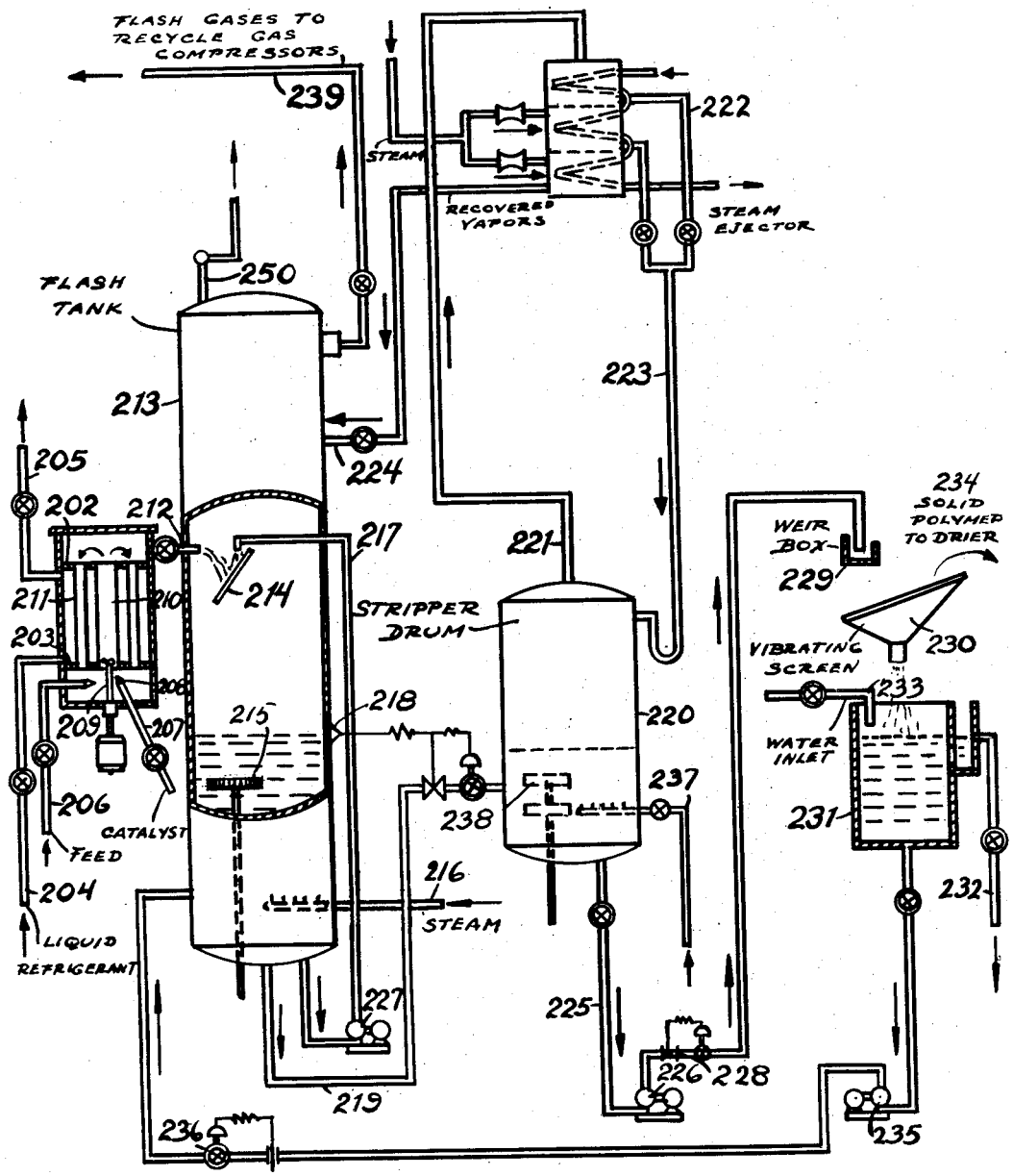
FIG.-III

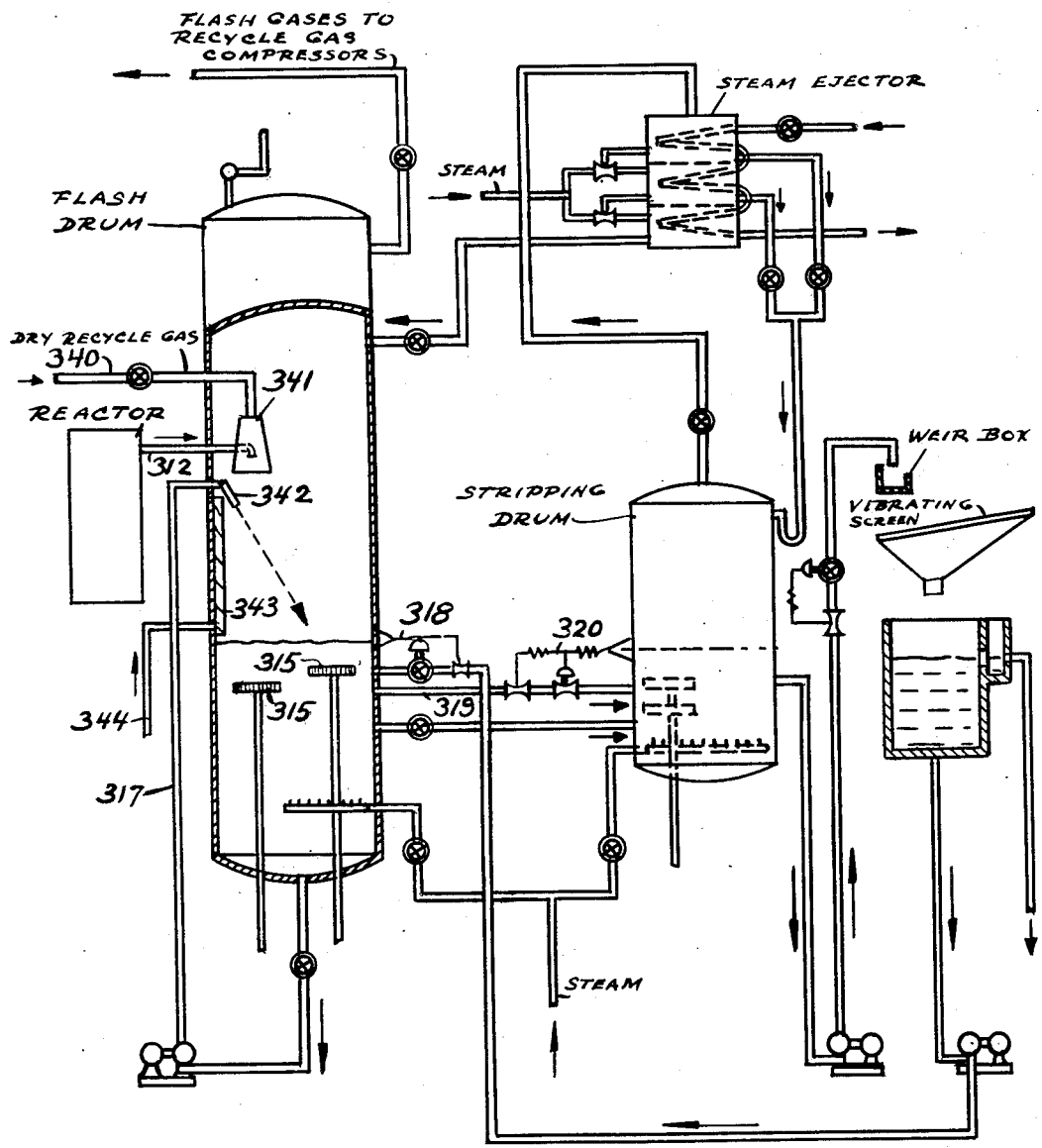
FIG.-IV

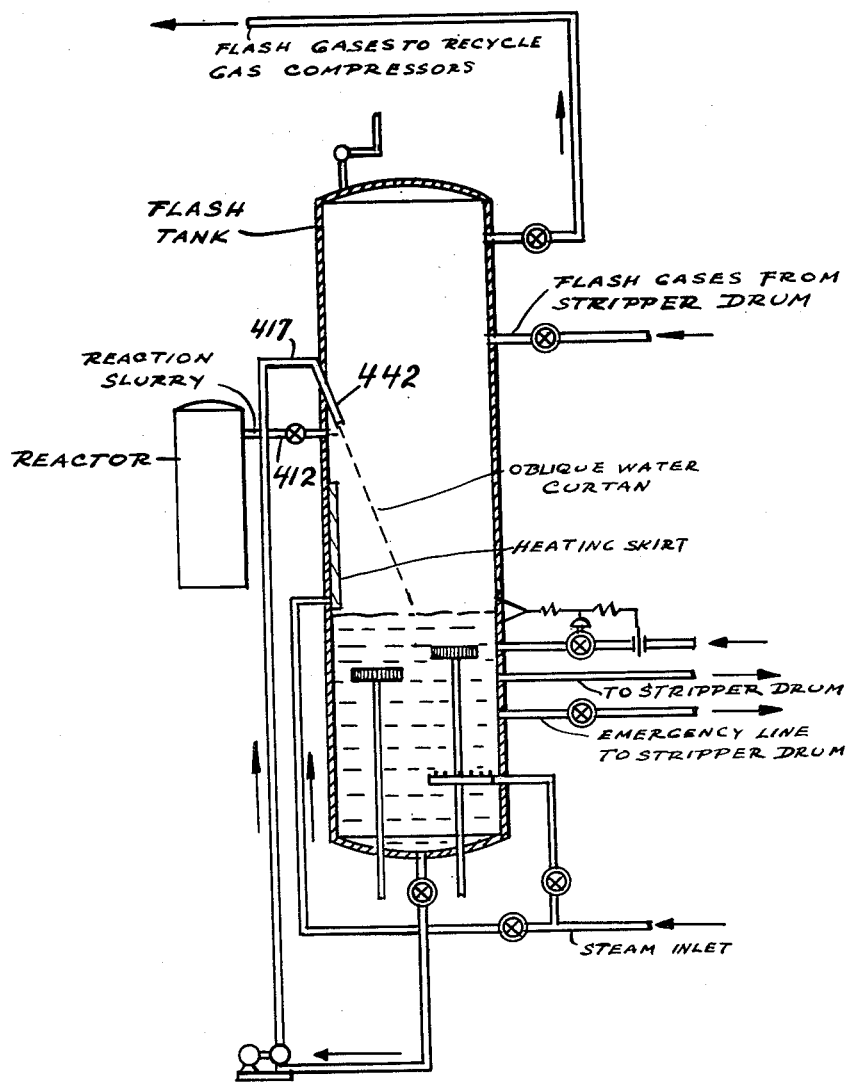
FIG.-V

Patented Mar. 8, 1949

2,463,866

UNITED STATES PATENT OFFICE 2,463,866

PROCESS FOR THE PRODUCTION AND RE-
COVERY OF OLEFINIC ELASTOMERS

Arthur Donald Green, Cranford, N. J., assignor
to Standard Oil Development Company, a cor-
poration of Delaware Application November 25, 1943, Serial No. 511,699

7 Claims. (Cl. 260—93)

1

This invention relates to polymerization processes and apparatus and particularly to processes and apparatus for the low temperature polymerization of isoolefins or mixtures of isoolefins and diolefins.

It has been known for some time that high molecular weight polymers, i. e., having a molecular weight of from about 15,000–25,000 up to 300,000 or more (as determined by the Staudinger method) are obtained if isoolefins, such as isobutylene, are contacted with Friedel-Crafts type catalysts such as aluminum chloride and the like at temperatures below about −10° C. (See, for example, Mueller-Cunradi U. S. Patent No. 2,203,873, issued June 11, 1940.) More recently it was found that a copolymer which is curable with sulfur is obtained if a mixture of about 70 to 99.5 weight percent of an isoolefin such as isobutylene with about 30 to 0.5 weight percent of a conjugated diolefin such as butadiene or isoprene is treated with a solution of a Friedel-Crafts type catalyst such as aluminum chloride in a non-complex forming low freezing solvent such as methyl or ethyl chloride and at temperatures of between −10° C. and −160° C., preferably between −40° C. and −103° C. (See, for example, Australian Patent No. 112,875, issued July 31, 1941.) These polymerizations have been conducted in the presence of an internal refrigerant such as liquefied ethylene, in which case the heat of reaction is removed directly by evaporation of part of the ethylene without the necessity for transferring heat through the surfaces of the reaction vessels or through cooling coils arranged in the reaction vessels. On the other hand, there are certain definite advantages to be gained by conducting the reaction in the presence of other diluents which have a higher boiling point than ethylene and are incapable of serving as internal refrigerant, in which case it is necessary to provide some other cooling agent and to remove the heat of reaction by indirect cooling using heat exchanger surfaces. The advantages of the indirect cooling method are, firstly, that it is possible thereby to keep the refrigerant uncontaminated with other materials, thus eliminating the necessity for repurifying the refrigerant and, secondly, that it permits a greater choice of materials for use as diluent in the reaction and particularly it permits utilization of isobutylene itself as the principal diluent.

In view of the low temperatures at which the reaction is conducted, i. e., about −40° C. to about −160° C., and the highly volatile and inflammable nature of certain of the reactants, it is obvious that several serious problems are presented by the process. In the first place, it is necessary to shut or seal off the reaction space from the atmosphere in order to prevent escape of inflammable materials therefrom which would create a substantial fire and explosion hazard. In the second place, the polymer must be brought from a temperature of around −40° C. or lower up to room temperature or above, a range over which the polymer becomes very tacky and tends to agglomerate. Finally, it is necessary to bring the polymer from a reaction zone in which it is associated with highly volatile, inflammable materials out into the atmosphere sufficiently free from inflammable materials that no fire or explosion hazard is presented.

In the original laboratory work, the reaction was carried out batchwise and the polymer was removed as a large lump or mass. It became apparent at once that the handling of such lumps or masses of polymer would involve a number of serious disadvantages when this reaction was attempted on a larger scale. For example, in order adequately to wash out the residual catalyst and to remove completely the traces of volatile materials, it was necessary to wash and steam the polymerizates in heavy masticating apparatus such as kneaders, mills or Banbury mixers. This mixing or kneading in a Banbury type mill has been considered essential in the manufacture of low temperature isoolefin-diolefin copolymerizates, since these copolymers are vulcanizable and it was found that those polymers which were not so mixed or kneaded yielded vulcanizates containing blisters and flaws which rendered the vulcanizates practically useless. Aside from this, it was found that on a large scale there would be considerable difficulty and danger in transferring masses of polymer which still contained volatile, inflammable material from one vessel to another.

It is the object of this invention to provide the art with a method and apparatus whereby low temperature polymerization of isoolefins or of mixtures of isoolefins and diolefins may be conducted in a continuous and expeditious manner.

It is also the object of this invention to provide means for effectively sealing off a low temperature polymerization zone containing highly volatile, inflammable, and in many cases, toxic materials from the atmosphere and yet which permits ready withdrawal of polymer with a minimum of occluded or adsorbed volatile, inflammable material.

It is also an object of this invention to produce high molecular weight polymerizates of isoolefins and copolymerizates of isoolefins and diolefins in finely divided form thereby permitting degassing of the polymers in an extremely simple manner.

It is also an object of this invention to produce high molecular isoolefin polymers and isoolefin-diolefin copolymers in a sufficiently divided condition so that the polymers may be thoroughly degassed and the residues of catalyst removed therefrom by a relatively simple operation thereby making it unnecessary to resort to mechanical treatments such as hot milling and/or Banburying to degas the polymers.

It is a further object of this invention to vaporize unreacted volatile material at a relatively uniform rate and to recover and recycle the valuable materials in the reaction liquid accompanying the polymers leaving the reaction zone.

It is a further object of this invention to provide the art with a method and apparatus whereby a water slurry of finely divided high molecular weight polymerizates obtained by the polymerization of an isoolefin or by the copolymerization of a mixture of an isoolefin and a diolefin at low temperatures in the presence of Friedel-Crafts type catalysts may be produced continuously.

These and other objects will appear more clearly from the detailed description and claims which follow.

It has now been found that it is possible to carry out the reaction in such a manner as to keep the solid polymerizate particles in a finely divided condition suspended in the cold reaction mixture so that a slurry of solid polymer in the cold reaction mixture is obtained which can be handled at low temperature in pumps and pipes and which can be dropped into well-agitated warm water or other liquid whereby the volatile materials are effectively removed as vapors, leaving the polymer as a slurry of finely divided particles suspended in water. This process has the advantage not only of substantially freeing the polymer from the remainder of the unreacted reaction mixture thereby permitting the recycling of the volatile materials through a purification system and thence back into the reactor, but it serves further to seal off the reaction zone and the purification and recycling system from the atmosphere and permits the withdrawal of the polymer into the atmosphere relatively free from volatile, inflammable materials. The process when properly conducted also yields the polymer in finely divided form in a water slurry, whereupon it may be separated, washed and dried in very simple equipment.

The accompanying drawings illustrate several forms of apparatus that may be utilized in carrying out the present invention. In the drawings, Figure I is a vertical elevation, partly in section of a polymerization and polymer recovery equipment in accordance with the present invention.

Figure II is a diagrammatic vertical elevation showing another form of polymerization and polymer recovery equipment.

Figures III, IV and V are vertical elevations, partly in section of several alternative arrangements of preferred forms of flash tanks and slurry handling equipment.

Referring to the drawings, in Figure I, the polymerization equipment desirably consists of a reactor member 1 having a jacket 2 therearound for the circulation of a refrigerant, preferably liquid ethylene. The reactor is equipped with a stirrer 3 carried upon a shaft 4 which is driven by any convenient source of power through gears 5 and a shaft 6. The polymerizable olefinic materials are supplied to the reactor through pipe member 7. A second pipe member 8 which preferably is equipped with a nebulizing spray head 9 on its lower end is utilized for supplying the catalyst to the reactants in 1. A vapor outlet pipe member 11 is provided leading from the top of the reactor to a suitable purification and recovery system. The discharge pipe comprises a downwardly extending leg 12 which is connected to an upwardly extending leg 15. The discharge pipe also forms a seal due to the simultaneous presence of a liquid level in both of said legs so that no vapor can back up into the reactor. Jackets 14 and 22 are provided around the discharge pipe for the circulation of a refrigerant such as ethylene. In view of the tendency of the polymer to settle in the discharge or seal pipe and in order to prevent plugging, means may be provided as in the form of a screw conveyor 16 in leg 15 for forcing the solid polymer up this inclined pipe. A supporting shaft 18 is provided for conveyor screw 16 and extends through a packing gland 19 and is connected to a source of driving power 21. The end of the screw conveyor 16 extends into the end of a water slurrying chamber 23. The slurrying chamber 23 preferably consists of a metal tank, one end of which is closed in and provided with an exhaust pipe 24 for the removal of volatilized hydrocarbon material and delivery of the volatilized hydrocarbon material to the separating and purifying system. The closed portion of the slurrying chamber 23 is desirably provided with a relief pipe 25 passing to a water seal member 26 and thence to an exhaust pipe 27. Within the tank member 23 there are provided a pair of roll members 28 and 29 over which passes a flexible belt member 31 equipped with bucket members 32. The roll 28 is positioned well up inside the closed end of the tank member 23 as shown in Figure 1, and the roll member 29 is positioned near the bottom and to one side of the closed portion of the tank. A partition 33 is likewise provided and the tank is filled nearly full of water. Another roll member 34 is likewise provided near the top of the uncovered portion of the tank member 23 and a belt member 35, preferably in the form of an endless wire screen is provided passing over the roll member 34 and over the far end of the open portion of the tank 23. The belt 35 is carried on additional rollers 36 and 37 under a water spray member 38, over a collector trough 39 and another guide roller 41 to an end roller 42 under a pressure roller 43.

In the operation of this embodiment of the invention, the polymerization mixture is prepared in convenient mixing tanks (not shown). The polymerization mixture desirably consists of from about 70 to 99.5 wt. percent of an isoolefin having from 4 to 8 carbon atoms per molecule, isobutylene being the preferred material; and from about 30 to 0.5 wt. percent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins such as dimethylallene or the triolefins such as mycrene, having up to 10 or 12 carbon atoms per molecule, may also be used. The polymerization mixture contains in addition from 100 parts to 700 or more parts of liquid ethylene. The presence of the liquid ethylene cools the mixture to a temperature between −97° C. and −103° C., which temperature is well maintained by the presence of liquid ethylene in the refrigerating jacket 2 of the polymerization reactor 1.

The cold polymerization mixture is delivered through the pipeline 7 to the reactor 1 and the stirrer 3 is put into operation. When the reactor is filled to the overflow level, the polymerization catalyst is delivered through a pipe 8 and the spray head 9.

The catalyst conveniently consists of a solution of a Friedel-Crafts type catalyst such as aluminum chloride, in solution in a non-complex-forming, low-freezing solvent such as ethyl or methyl chloride or carbon disulphide or other mono- or polyhalide containing up to 3 or 4 carbon atoms per molecule or other non-complex-forming solvent which is liquid at temperatures below about −30° C. The list of useable Friedel-Crafts catalysts is well shown by N. O. Calloway in his article on "The Friedel-Crafts synthesis" in the issue of "Chemical Reviews" published for the American Chemical Society at Baltimore in 1935, being volume XVII, Number 3, the article beginning on page 327, the list being particularly well shown on page 375.

This catalyst is preferably supplied to the reaction mixture in the form of a finely divided spray or mist onto the surface of the rapidly stirred reaction mixture but it may be added in a fine stream into the turbulent zone adjacent to the stirrer 3 or may be added by any other convenient means which will yield a rapid and thorough dispersion of the catalyst liquid into the olefinic mixture. The reaction proceeds promptly to form a slurry of solid polymer particles in unreacted olefinic components. The rate of catalyst delivery with respect to the rate of delivery of fresh reactants is preferably adjusted to such a relationship that the proportion of solid polymer in the reacted mixture is less than about 20%. The polymerization reaction being exothermic, heat is liberated as the solid polymer forms. The temperature of the reaction mixture is maintained at a low level by allowing a portion of the ethylene in the mixture to vaporize. The vaporized ethylene plus smaller amounts of reactant vapors and catalyst solvent vapors escape to the recovery system through line 11.

When the reactor is filled to the overflow level, the addition of further olefinic material through the pipeline 7 and catalyst solution through line 8 causes an overflow of the polymer slurry through the pipe 12 to the screw conveyor 16. The screw conveyor forces the polymer slurry upward through the pipe 15 to the closed portion of the tank 23 and delivers the solid polymer with from about 300% of its weight to about 900% of its weight of liquid, unreacted, olefinic material and drops it into the warm water in the tank 23. The warm water volatilizes out most of the volatile components and at the same time deactivates and washes out the deactivated catalyst. Steam is supplied to the flash tank water at 10, to replace the heat lost due to vaporization of the unreacted materials. The polymer tends to float upon the surface of the water and is caught by the buckets 32 on the belt 31 and carried downward through the water under the sealing wall 33 and discharged on the far side of the sealing wall. The volatilized olefinic material passes through the pipe 24 to the purifying and recycling system for reuse. The solid polymer discharged under the sealing wall contains less than 10%, usually less than 1% of volatile hydrocarbon materials. The solid polymer again floats to the surface and is caught upon the upper surface of the belt 35, carried under the water spray from the spray member 38, through the squeeze roll 43 and is delivered for such further processing as is desired, this further processing desirably including a treatment in an oven dryer in order to dry the polymer and drive off any residual volatile material and also, if desired, a milling treatment to compact it into a coherent sheet for shipment and compounding.

Figure II shows a somewhat different, and in some respects simpler, flashing system and may best be followed by referring back to Figure I. The reactor 101 is of the same type as shown in Figure I, using an internal refrigerant. It is provided with feed and internal refrigerant inlets 102 and 103, agitator 104, catalyst solution inlet 105 and cold slurry discharge line 106. The discharge line 106 is surrounded by a jacket 107, providing a dead air space around 106 as insulation between the cold reaction zone and the relatively warm flashing zone. The slurry of polymer in cold unreacted hydrocarbon, diluent and/or internal refrigerant mixture enters the flashing zone through a large diameter chimney 109 and drops into the water in flash tank 108. The water in said flash tank is maintained at a suitably warm temperature (100 to 180° F., i. e., 38 to 82° C.) by means of steam distributor 122. The contents of the flash tank are agitated by reciprocating agitator 113 provided with inclined paddles 112 and actuated by eccentric drive shaft 114. Flashed vapors are returned to a recovery system at 126, through discharge pipe 110. The vapor discharge line is provided with a water seal 124 and a mercury seal 125, designed to relieve any sudden surges exceeding one or two pounds per square inch above atmospheric pressure. The water seal and the mercury seal discharge to the atmosphere, the water seal being set to discharge at a lower pressure than the mercury seal.

The polymer entering the flashing zone is aided in its journey to the flash tank proper by water spray 111, which also keeps polymer from sticking to the walls of the chimney. Steam introduced at 127 prevents formation of ice at or near the entrance of cold reaction mixture to the flashing zone. The polymer suspended in the water in tank 108 by the reciprocating action of paddles 112, passes in succession under baffles 115 and 116 into discharge compartment 117 wherein the polymer floats to the surface and can be removed by hand for drying and milling treatment. Water is kept in circulation by pumping out of compartment 117 through line 118, pump 120, line 121 and back into the flashing zone through spray 111. Fresh water is added in small amounts through line 128 and corresponding amounts of water are purged from the system through drain 119.

Referring to Figure III, the polymerization step is conducted in a tube bundle type of reactor such as described in the patent application of Bannon (U. S. Serial No. 448,575, filed June 26, 1942). In this reactor no internal refrigerant is used, all the heat of reaction being transferred through the reactor walls to an external refrigerant. The liquid refrigerant, suitably ethylene as in Figure I, is introduced into the space between tube sheets 202 and 203 through line 204, while vaporized refrigerant leaves the said space through line 205. Precooled reactant mixture of isoolefin and diolefin as described in connection with Figure I, and in addition containing 0 to about 10 or 20 parts of diluent per part of reactant hydrocarbon mixture, enters the reactor through line 206. Suitable diluents are alkyl chlorides having 1 to 2 carbon atoms per molecule such as ethyl chloride, methyl chloride, or isobutane, and similar materials. Catalyst solution, as described in connection with Figure I, is added through line 207 provided with a suitable dispersing nozzle, 208. The reactant mixture is thoroughly agitated by impeller type agitator 209, so that a circulation of the reacting mixture is produced up through central tube 210 and down through a plurality of peripheral smaller tubes 211, set between tube sheets 202 and 203. The reactor is maintained essentially full of liquid, a mixture of relatively finely divided polymer and excess unreacted hydrocarbons plus diluent overflowing from the reactor through line 212 in amount corresponding to the material fed to the reactor through lines 206 and 207. The size of line 212 is so chosen, in relation to the throughput of material through the reactor, that the line is full of liquid and the velocity of flow of slurry into flash tank 213 is preferably over about 3 feet per second or high enough to keep the line running full. Flash tank 213 is a relatively large vessel designed to withstand mild pressure surges, of the order of 1–10 lbs./sq. in. having a relatively large vapor space, providing preferably several minutes nominal hold-up of the vapors in the flash tank. The tank is supplied with water maintained at a suitable level by means of level control 218 actuating flow control valve 240 which controls the rate of withdrawal of slurry from the flash tank. The water slurry is maintained at a suitably elevated temperature level, for example at 100 to 180° F., by means of steam injected through pipe 216; and is kept well agitated by means of turbine type agitator 215. For the production of a finely divided uniform slurry it has been found preferable to supply agitation such that at least 2 to 10 H. P. is absorbed by each 1,000 gallons of liquid. Splash plate 214 is provided opposite the inlet line 212 to provide for immediate break up of the incoming stream of polymer and low boiling liquids and for dispersing them in a copious stream of water flowing from line 217 and pump 227 over the said splash plate. In this way provision is made for warming up the polymer and volatilizing the liquids while the polymer is in a finely divided condition, and denying said polymer an opportunity for sticking together during this warming up period when it is particularly tacky. The vapors leave the flashing zone through line 239 and are fed to compression, drying, liquefaction, and distillation equipment for recovery and return to the reaction zone. The slurry of polymer in water leaves the flashing zone through line 219 and control valve 240, as mentioned above, and passes into stripping vessel 220 wherein a suitable sub-atmospheric pressure is maintained. The purpose of this stripping zone is to complete as far as possible removal of volatile materials from the polymer and from the water. In this way loss of valuable reactant or diluents is minimized, as are fire and other hazards. In addition to the removal of these volatile materials from the polymer, the stripping operation when combined with properly controlled hot air drying in a thru-circulation, tunnel type dryer, makes it possible to achieve essentially complete degassing without necessitating resort to heavy mechanical treatment. The stripping vessel is, like the flashing vessel, provided with an agitator 238, a steam injector 237, and a vapor outlet 221. In this illustration the pressure in the stripping zone is maintained at about 2 to 5 #/sq. in. abs. by means of a 2-stage steam injector 222, which embodies condensers before and after each ejector stage. The condensate from the low pressure stages is returned to the stripper through leg 223 while the recovered vapors are sent to the flashing zone through line 224. The slurry leaves the stripper through line 225 with the aid of pump 226 at a rate controlled by flow controller 228, and passes into weir box 229 from which it is distributed over vibrating screen 230. Excess water drains through the vibrating screen into tank 231, the moist polymer discharged from the end of vibrating screen at 234 containing a substantial percentage of water. Said moist polymer is supplied to an endless screen passing through a tunnel dryer of the through-circulation type in which hot air is recirculated over steam coils and down through a bed of material on the screen. Fresh air enters at the discharge end of the tunnel and moist air is exhausted to the atmosphere at various points along the dryer. Drying temperatures of up to about 250° F. are utilized and these conditions of good contact of the rapidly moving air stream with finely divided polymer suffice to drive off residual volatile materials which would ordinarily give rise to blister formation during vulcanization if they were not removed. Water draining through vibrating screen 230 into tank 231 is returned to the flash tank 213 by means of pump 235 and flow controller 236 in order to save water and any valuable materials contained therein as discussed below.

Tank 231 is provided with fresh water makeup and a water overflow to provide for purging any undesirable accumulations. It will be noted in Figure III that flow controllers shown in slurry lines utilize a Venturi meter instead of the usual orifice type of meter as the measuring device in order to avoid plugging by the solid polymer particles. The control valves are also of a special streamlined design which are not readily plugged by solid material. In order to take care of any large surges in pressure as may occur if a large slug of polymer or of reaction mixture should strike the water in the tank, a suitable safety valve 250 may be provided on the flash chamber.

In Figure IV a modification of the system shown in Figure III is shown which provides in many cases smoother and more easily controllable operation. The line 312 delivering cold slurry from the reactor to the flash tank is increased in size to allow passage of larger particles of solids although sacrificing in velocity of flow. This line 312 is also tilted upward to provide an effective liquid seal on the reactor. In this case the slurry leaves the reactor through line 312 at a velocity of 1 to 3 feet per second and discharges into the flash tank in a downward direction. To prevent water vapor from the flash tank getting back into the line 312 which may not run full, conical hood 341 is provided over this discharge end of piping

312. This hood is of the type described in U. S. patent application Serial No. 502,258, filed September 14, 1943, by Messrs. E. V. Murphree, W. W. Waterman and A. D. Green, now U. S. Patent 2,395,901, and is for the purpose of preventing access of water vapor to the immediate neighborhood of a cold reactor discharge pipe, thus preventing build-up of ice or icy hydrates in this region. The hood is supplied with a dry flushing gas through line 340. The flushing gas may be an inert gas such as $CO_2$, nitrogen, methane, or more conveniently, a small stream of dry recycle gas from the recovery system. A velocity of flushing gas at the bottom of the conical hood of 10 to 15' per minute has been found sufficient to prevent icing.

The polymer and cold liquid falling from the hood is caught by a rapidly moving sheet of water from line 317 discharging through jet 342 and directed at the center of the surface of the water in the flash tank. For this purpose a 1½" x 7" rectangular nozzle may be advantageously used for a water flow of around 400 gallons per minute. To protect the tank from sharp thermal shock in case of failure of the water jet a skirt or baffle 343 is provided, a small amount of steam being admitted behind it through line 344. In this modification two turbine type agitators 315 are used to provide a somewhat better distribution of agitation of the slurry in the tank, and the slurry is withdrawn from the middle of the tank at 319 instead of at the bottom to give a more uniform solids concentration in the exit slurry.

The level control system of Figure IV has been modified so that a constant level is held in the stripping zone as well as in the flashing zone. In this case the stripper level actuates control of the rate of flow of slurry from the flashing zone to the stripping zone by control valve 320 and the liquid level in the flashing zone controls the return of water to said flashing zone from the vibrating screen sump by means of control valve 318. In this way a minor upset in flow in any part of the system is less likely to cause improper levels to be held in either of the two zones. It is important to maintain the proper level, since too low a level results in an inordinately heavy and difficultly handled slurry while too high a level increases the volume of liquid being agitated and hence decreases agitation per unit volume to the extent that considerable settling of the polymer to the surface tends to occur.

Figure V is a further modification of the system described in detail in Figure III. In this case the flow controls are as in Figure IV and the only further modification from the scheme of Figure III beyond those mentioned above corresponding to Figure IV is the omission of the hood and flushing gas at the inlet flash tank, reliance being placed upon efficient action of an oblique water curtain from line 417 entering the tank through jet 442 above the reactor discharge pipe, and upon a high velocity in the reactor discharge line 412 to prevent icing at the entrance to the flash tank.

In the first two embodiments of the invention the slurry is not as finely divided as is produced in the equipment shown in Figures III. IV and V.

The several embodiments of this invention are particularly adapted to the treatment of any solid, high molecular, low temperature polymerizates from isoolefinic materials alone or from mixtures of isoolefinic materials with a number of diolefinic materials capable of copolymerizing with isoolefins. The isoolefin that is preferred is isobutylene but other isoolefins containing up to about 8 carbon atoms per molecule may be used. The copolymerizable diolefinic materials include butadienes and substituted butadienes, especially isoprene, piperylene and dimethyl butadiene, i. e., conjugated diolefins having 4 to 6 carbon atoms per molecule. Other polyolefinic materials containing up to 12 or 14 carbon atoms per molecule such as myrcene and certain non-conjugated diolefins, such as dimethylallene and the like, are also useful.

The olefinic materials are preferably cooled to temperatures below $-10°$ C., preferably below about $-40°$ C. and polymerized by the addition of a catalyst consisting of a Friedel-Crafts type catalyst dissolved in a low-freezing, non-complex-forming solvent such as methyl-, ethyl- or propyl-, mono- or polyhalides or carbon disulfide or sulfuryl chloride or the like. The reactants, catalysts, solvents and the like used and the general properties of the polymers formed are described in the above-mentioned Mueller-Cunradi et al. U. S. Patent No. 2,203,873 and the Australian Patent No. 112,875.

It may be seen, therefore, that the present invention involves the preparation of solid polymers which have a considerable range of molecular weight and resulting physical characteristics depending upon the operating conditions chosen and maintained in the reaction zone. In general, when the polymerization is conducted in the presence of a non-solvent diluent at suitably low temperatures, the polymer is relatively non-sticky in the reaction pone. When removed from the reaction zone and warmed in the presence of adhering reaction liquids, it becomes exceedingly sticky, even in the case of the higher molecular weight isoolefin-diolefin copolymer type products. After evaporation of the volatiles is completed, the stickiness of the product depends to a large extent on the molecular weight distribution in the polymer.

In order to avoid the agglomeration of polymer particles due to this tackiness, this invention provides for immediately dispersing the material leaving the reaction zone within a large body of warm fluid which may be either a nonsolvent for the polymer, such as water, alcohols, ketones, aqueous liquids or solutions or the like or a solvent for the polymer, such as light naphtha, benzene, etc. This large body of fluid is supplied with heat at a rate adequate to maintain it at a sufficiently elevated temperature to insure rapid heat transfer to the cold liquid and prevent solid (ice or wax) formation. The body of fluid is also vigorously agitated to insure efficient heat transfer and/or the prevention of occlusion of volatile liquids or pockets surrounded by polymer, ice or other solid matter which would explode when heated sufficiently to volatilize the occluded liquid. The vapor space in the flashing zone is made sufficiently large to substantially even out the flow of gas therefrom to the recovery equipment and the gas outlet to the recovery and recycle system is adequately protected against surges. The pressure under which the flash tank is operated may be maintained close to atmospheric pressure or it may be sufficiently high so that while the reaction liquids are rapidly vaporized at the relatively warm temperature of the flashing zone, the vapors may readily be condensed with the aid of cooling water without the aid of gas compressors or refrigeration. An atmospheric or subatmospheric pressure is maintained in the second flashing zone, the vapors therefrom being vented or compressed and combined with those from the first stage. This type of operation is somewhat easier with reaction diluents less volatile than methyl chloride. The polymer is removed from the flashing zone through a seal of the said flashing liquid thereby preventing loss or escape of the vapors liberated in the flashing zone.

The second flashing or stripping zone may or may not be included. When it is provided, it is operated at a pressure substantially lower than that of the first flashing zone and with or without additional supply of heat or stripping vapors.

Various auxiliary chemicals may be added to the flash tank liquid. Zinc stearate mentioned above or other divalent metal salts of higher fatty acids in general or materials such as clays, pigments or carbon black may be added to the liquid in the flash tank in order to aid the maintenance of the polymer as discrete particles in the slurry. Other agents such as stabilizers like phenyl-beta-naphthylamine, diphenylamine, sulfur or other materials which are useful in the finished polymer may be added to the flashing liquid as a matter of convenience. It is also desirable to add agents which prevent the build-up of acidity in the flash tank liquid because of the fact that the catalysts used normally liberate acid upon hydrolysis, which while small in amount eventually builds up to an objectionable degree unless a considerable purging of the liquid is allowed to take place. Suitable agents for this purpose include soda ash, caustic soda, calcium oxide, magnesium oxide or other alkaline materials.

The foregoing description is illustrative of the present invention. It will be obvious to those skilled in this art, however, that numerous variations are possible without departing from the purview of this invention as defined by the following claims.

What I claim and desire to secure by Letters Patent is:

1. In the process which comprises continuously supplying a mixture of isobutylene and an organic non-reactive diluent which remains liquid at the polymerization temperature into a reaction zone, maintaining the contents of the reaction zone at a temperature between —40° C. and —160° C., continuously adding a Friedel-Crafts catalyst to form a slurry of solid polymer particles in cold reaction liquid, the improvement which comprises discharging said cold slurry in an enclosed quenching zone into a heated, well-agitated aqueous liquid in order to flash off the volatile reaction liquid and separating the polymer particles from said liquid.

2. In the process which comprises continuously supplying a mixture of isobutylene and methyl chloride into a reaction zone, maintaining the contents of the reaction zone at a temperature between —97° C. and —103° C., continuously adding aluminum chloride to form a slurry of solid polymer particles in cold reaction liquid, the improvement which comprises passing said cold slurry into a closed quenching zone and there discharging it onto heated, well-agitated water maintained at a temperature between 38° C. and 82° C. in order to flash off the volatile reaction liquid and form a slurry of finely divided polymer particles in water, recycling a stream of the heated water from the bottom of the quenching zone to the top of the quenching zone, withdrawing from said quenching zone a liquid stream of the water slurry, separating the polymer particles from the liquid stream, also withdrawing from said quenching zone a gas stream of volatilized reaction liquid and water vapor, subjecting said gas stream to a recovery treatment and recycling the reaction material recovered from said gas stream to the polymerization.

3. In the process which comprises continuously supplying a mixture of isobutylene and a polyolefin containing from 4 to 10 carbon atoms per molecule and an organic non-reactive diluent which remains liquid at the polymerization temperature into a reaction zone at a temperature between —40° C. and —160° C., continuously adding a solution of a Friedel-Crafts catalyst in a solvent which is liquid at reaction temperatures and forms no complex with the catalyst, to form a slurry of solid polymer particles in cold reaction liquid, the improvement which comprises discharging said cold slurry in a closed quenching zone onto a surface of heated, well-agitated water in order to flash off the volatile reaction liquid and form a slurry of finely divided polymer particles in water, and separating the polymer particles from said water slurry.

4. In the process which comprises continuously supplying a feed stock comprising one part of a mixture consisting of 70 to 99.5 weight percent of isobutylene and 30 to 0.5 weight percent of a conjugated diolefin containing from 4 to 6 carbon atoms per molecule and zero to 10 parts of an organic non-reactive diluent which is liquid at the polymerization temperature to a reaction zone, adding thereto a solution of a Friedel-Crafts catalyst in an alkyl chloride having 1 to 3 carbon atoms per molecule while maintaining the reaction mixture at a temperature between —40° C. and —103° C., thereby forming a slurry of solid polymer particles in cold reaction liquid, the improvement which comprises withdrawing a stream of the cold slurry from the reaction zone to a closed quenching zone and there discharging it into heated, well-agitated water maintained at a temperature between 38° C. and 82° C. in order to flash off the volatile reaction liquids and form a slurry of finely-divided polymer particles in water, recycling a stream of hot water from the bottom of the quenching zone to the top of the quenching zone, withdrawing a stream of the water slurry from the quenching zone and separating the polymer particles from said water slurry, also withdrawing from the quenching zone a gas stream of water vapor and volatilized reaction liquid, subjecting the gas stream to a recovery treatment and recycling the recovered reaction liquid to the polymerization.

5. In the process which comprises continuously supplying a feed stock comprising one part of a mixture consisting of 70 to 99.5 weight percent of isobutylene and 30 to 0.5 weight percent of isoprene and zero to 10 parts of methyl chloride to a reaction zone, adding thereto a solution of aluminum chloride in methyl chloride while maintaining the reaction mixture at a temperature between —97° C. and —103° C. and thereby forming a slurry of solid polymer particles in cold reaction liquid, the improvement of withdrawing a stream of said cold slurry from the reaction zone to a closed quenching zone, separating said quenching zone from said reaction zone by a liquid barrier formed of the flowing stream of slurry, in the quenching zone discharging the slurry as an overhead spray into heated, well-agitated water maintained at a temperature between 38° C. and 82° C. in order to flash off the volatile reaction liquid and form a slurry of finely-divided polymer particles in water, recycling a stream of heated water from the bottom of the quenching zone to the top of the quenching zone and there mixing it as a spray with the incoming cold slurry of polymer particles and cold reaction liquid, withdrawing a stream of the formed water slurry from the quenching zone and separating the polymer particles from said water slurry, also withdrawing an overhead vapor stream from the quenching zone, subjecting said vapor stream to a recovery treatment and recycling the recovered monomers and diluent to the polymerization.

6. A process according to claim 5 wherein the slurry of finely-divided polymer particles in water is vacuum stripped prior to separation of the polymer particles therefrom.

7. A process according to claim 4 wherein the polymerization diluent is ethyl chloride.

ARTHUR DONALD GREEN.

REFERENCES CITED

The following references are of record in the file of this patent:

UNITED STATES PATENTS

| Number | Name | Date |
| --- | --- | --- |
| 2,131,905 | Strezynski | Oct. 4, 1938 |
| 2,229,661 | Mann | Jan. 28, 1941 |
| 2,273,158 | Thomas | Feb. 17, 1942 |
| 2,276,893 | Thomas | Mar. 17, 1942 |
| 2,378,138 | Gaylor | June 12, 1945 |
| 2,395,901 | Murphree et al. | Mar. 5, 1946 |